(12) United States Patent
Park et al.

(10) Patent No.: US 12,166,217 B2
(45) Date of Patent: Dec. 10, 2024

(54) SECONDARY BATTERY

(71) Applicant: SAMSUNG SDI CO., LTD., Yongin-si (KR)

(72) Inventors: Jung Hyun Park, Yongin-si (KR); Gun Gue Park, Yongin-si (KR); June Hyoung Park, Yongin-si (KR); Hyun Ki Jeong, Yongin-si (KR); Sung Soo Park, Yongin-si (KR); Won Ik Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 616 days.

(21) Appl. No.: 17/424,137

(22) PCT Filed: Dec. 10, 2019

(86) PCT No.: PCT/KR2019/017377
§ 371 (c)(1),
(2) Date: Jul. 19, 2021

(87) PCT Pub. No.: WO2020/159071
PCT Pub. Date: Aug. 6, 2020

(65) Prior Publication Data
US 2022/0131216 A1    Apr. 28, 2022

(30) Foreign Application Priority Data

Jan. 30, 2019 (KR) .................. 10-2019-0011957

(51) Int. Cl.
*H01M 50/107* (2021.01)
*H01M 10/04* (2006.01)
(Continued)

(52) U.S. Cl.
CPC ..... *H01M 50/107* (2021.01); *H01M 10/0422* (2013.01); *H01M 10/0431* (2013.01);
(Continued)

(58) Field of Classification Search
CPC ......... H01M 10/0422; H01M 10/0431; H01M 10/0587; H01M 50/107; H01M 50/154;
(Continued)

(56) References Cited

U.S. PATENT DOCUMENTS 6,692,863 B1    2/2004   Nakanishi et al.
6,730,438 B2    5/2004   Nakanishi et al.
(Continued)

FOREIGN PATENT DOCUMENTS

CN    101404338 A    4/2009
CN    101443151 A    5/2009
(Continued)

OTHER PUBLICATIONS

Machine translation JP2010080081A (Year: 2010).*
(Continued)

*Primary Examiner* — Victoria H Lynch
(74) *Attorney, Agent, or Firm* — Lewis Roca Rothgerber Christie LLP

(57) ABSTRACT

The present invention relates to a secondary battery in which an electrode assembly and a current collection plate may be easily welded and safety may be improved. As an embodiment, disclosed is a secondary battery comprising: an electrode assembly which is formed by winding a first electrode plate having a first electrode uncoated part, a separator, and a second electrode plate having a second electrode uncoated part, the first electrode uncoated part protruding upwards, and the second electrode uncoated part protruding downwards; and a first current collection plate which is electrically connected to the first electrode uncoated part and has a concave-convex part protruding downwards, wherein the width of the concave-convex part becomes wider from the center of the first current collection plate toward the outer periphery thereof.

10 Claims, 4 Drawing Sheets

(51) Int. Cl.
  *H01M 50/148* (2021.01)
  *H01M 50/528* (2021.01)
  *H01M 50/533* (2021.01)
  *H01M 50/536* (2021.01)

(52) U.S. Cl.
  CPC ....... *H01M 50/154* (2021.01); *H01M 50/528* (2021.01); *H01M 50/533* (2021.01); *H01M 50/536* (2021.01)

(58) Field of Classification Search
  CPC ............. H01M 50/528; H01M 50/533; H01M 50/536; H01M 50/545; H01M 50/552; Y02E 60/10; Y02P 70/50
  See application file for complete search history.

(56) References Cited

U.S. PATENT DOCUMENTS

| | | | |
|---|---|---|---|
| 6,899,973 | B2 | 5/2005 | Nakanishi et al. |
| 6,995,333 | B2 | 2/2006 | Nakanishi et al. |
| 7,318,980 | B2 | 1/2008 | Kim |
| 7,931,186 | B2 | 4/2011 | Deley et al. |
| 8,100,317 | B2 | 1/2012 | Deley et al. |
| 8,822,065 | B2 | 9/2014 | Byun et al. |
| 9,040,191 | B2 | 5/2015 | Yoon et al. |
| 2002/0142211 | A1 | 10/2002 | Nakanishi et al. |
| 2004/0128826 | A1 | 7/2004 | Nakanishi et al. |
| 2004/0131930 | A1 | 7/2004 | Nakanishi et al. |
| 2004/0247998 | A1 | 12/2004 | Nakanishi et al. |
| 2005/0214640 | A1 | 9/2005 | Kim |
| 2007/0298317 | A1 | 12/2007 | Brodd et al. |
| 2009/0087733 | A1 | 4/2009 | Yoon et al. |
| 2010/0181365 | A1 | 7/2010 | Deley et al. |
| 2010/0233521 | A1 | 9/2010 | Byun et al. |
| 2011/0174865 | A1 | 7/2011 | Deley et al. |
| 2015/0243453 | A1 | 8/2015 | Taguchi |
| 2017/0373339 | A1 | 12/2017 | Cho et al. |
| 2020/0058931 | A1* | 2/2020 | Yoon ..................... H01M 4/382 |

FOREIGN PATENT DOCUMENTS

| | | |
|---|---|---|
| CN | 101834305 A | 9/2010 |
| CN | 106271330 A | 1/2017 |
| CN | 109166998 A | 1/2019 |
| JP | 10-294102 A | 11/1998 |
| JP | 2001-160387 A | 6/2001 |
| JP | 2007-122942 A | 5/2007 |
| JP | 2007-280743 A | 10/2007 |
| JP | 4159383 B2 | 10/2008 |
| JP | 2010-80081 A | 4/2010 |
| JP | 4745692 B2 | 8/2011 |
| KR | 10-2016-0110610 A | 9/2016 |

OTHER PUBLICATIONS

Machine translation JPH10294102A (Year: 1998).*
Chinese Office Action dated Oct. 26, 2023, issued in Chinese Patent Application No. 201980094473.3, 7 pages.
International Search Report dated Mar. 16, 2020, for International Application No. PCT/KR2019/017377, 5 pages.
EPO Extended European Search Report dated Sep. 21, 2022, issued in corresponding European Patent Application No. 19913855.3 (9 pages).

* cited by examiner

SECONDARY BATTERY

CROSS-REFERENCE TO RELATED APPLICATION(S)

This application is a U.S. National Phase Patent Application of PCT/KR2019/017377 filed Dec. 10, 2019, which claims priority to Korean patent application 10-2019-0011957, filed on Jan. 30, 2019, the entire content of each of which is hereby incorporated by reference.

TECHNICAL FIELD

The present invention relates to a secondary battery.

BACKGROUND ART

Unlike primary batteries that cannot be charged, secondary batteries can be repeatedly charged and discharged. A low capacity battery including a battery cell in the form of a pack may be used in small portable electronic devices, such as cellular phones or camcorders, while a high capacity battery including tens of battery cells connected to one another may be used as a power source for driving a motor, e.g., hybrid vehicles, or the like.

Such secondary batteries are manufactured in various shapes, representative examples of the shapes may include a cylindrical shape, prismatic shape and a pouch-type shape. The secondary battery is configured by inserting, into a case, an electrolyte and an electrode assembly which is formed by interposing a separator as an insulator, between positive and negative electrode plates, and installing a cap plate in the case.

The above information disclosed in this Background section is only for enhancement of understanding of the background of the invention and therefore it may contain information that does not constitute prior art.

DESCRIPTION OF EMBODIMENTS

Technical Problem

The present invention provides a secondary battery in which an electrode assembly and a current collection plate may be easily welded and safety may be improved.

Solution to Problem

According to the present invention, provided is a secondary battery comprising: an electrode assembly which is formed by winding a first electrode plate having a first electrode uncoated part, a separator, and a second electrode plate having a second electrode uncoated part, the first electrode uncoated part protruding upwards, and the second electrode uncoated part protruding downwards; and a first current collection plate which is electrically connected to the first electrode uncoated part and has a concave-convex part protruding downwards, wherein the width of the concave-convex part becomes wider from the center of the first current collection plate toward the outer periphery thereof.

The first current collecting plate may include a first through-hole formed in the center and a plurality of second through-holes formed outside the first through-hole.

The concave-convex part may have a plurality of concave-convex parts formed to be spaced apart outside the first through-hole.

The first electrode uncoated part may include a pressurized region that is partially pressurized to be flatly formed, and the concave-convex part may be welded to the pressurized region.

The pressurized region may be formed to increase in width from the center of the electrode assembly toward the outer periphery thereof so as to correspond to the concave-convex part.

The first plate may further include a position identification part formed outside the first through-hole.

The position identification part may be formed with a plurality of grooves or holes, and may be located inside the second through-hole.

The position identification part may be formed in an embossed shape.

The position identification part may be formed of engravings having different shapes to be spaced apart from each other.

The secondary battery may further include a circular second current collection plate electrically connected to the second electrode uncoated part and having a concave-convex part protruding upward, and the width of the concave-convex part becomes wider from the center of the second current collection plate toward the outer periphery thereof.

Advantageous Effects of Disclosure

The secondary battery according to an embodiment of the present invention includes a current collection plate in which a concave-convex part that becomes wider from the center toward the outer periphery thereof is formed, and thus the level of compaction of the pressurized region of the electrode uncoated part to which the concave-convex part is welded can be made constant. Accordingly, the weldability between the current collection plate and the electrode assembly can be improved, and it is possible to prevent a short circuit of the electrode assembly.

In addition, in the secondary battery according to an embodiment of the present invention, by forming a position identification part on the current collection plate, a scanning time for identifying a welding position can be shortened and welding position accuracy can be improved.

MODE OF DISCLOSURE

Hereinafter, example embodiments of the present invention will be described in detail.

The subject matter of the present invention, however, may be embodied in many different forms and should not be construed as being limited to the example (or exemplary) embodiments set forth herein. Rather, these example embodiments are provided so that this disclosure will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

Figure 1:
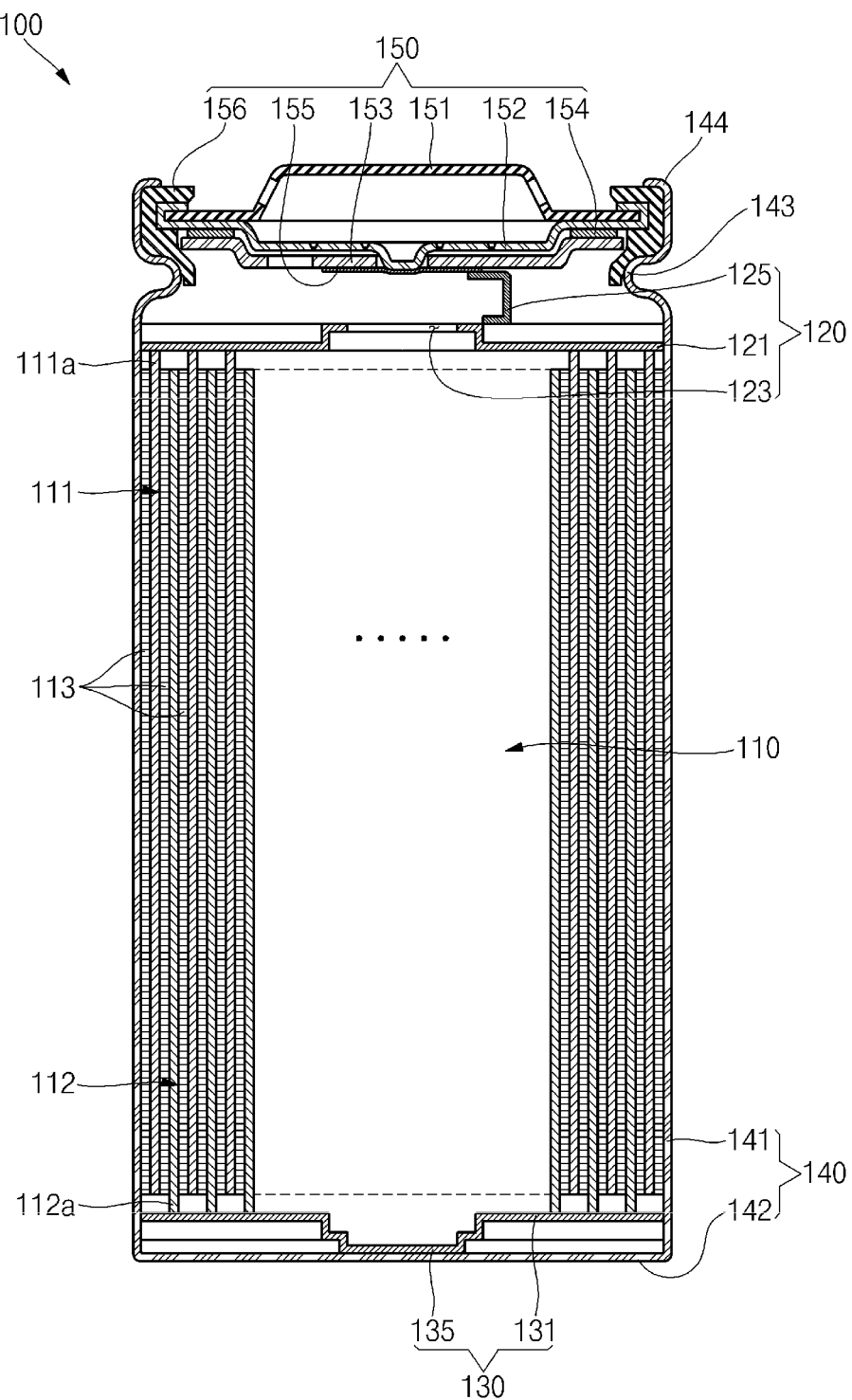
FIG. 1 is a cross-sectional view illustrating a secondary battery according to an embodiment of the present invention.
Figure 2:
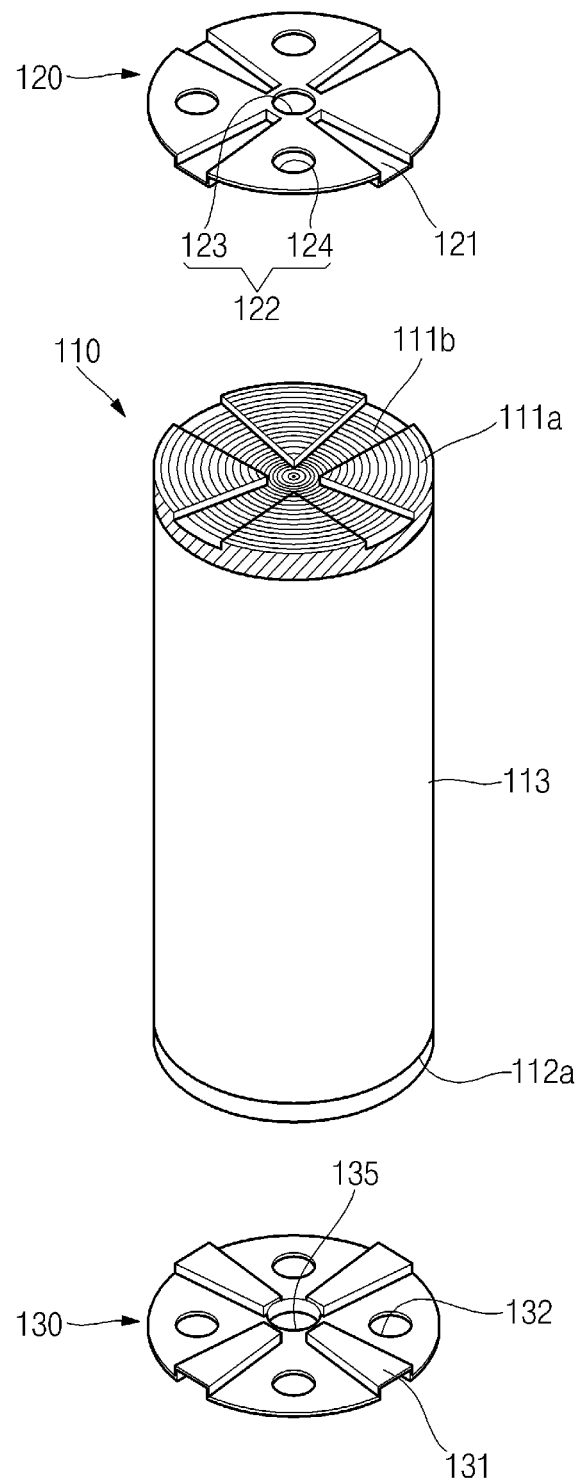
FIG. 2 is an exploded perspective view illustrating a part of a secondary battery according to an embodiment of the present invention.
Figure 3:
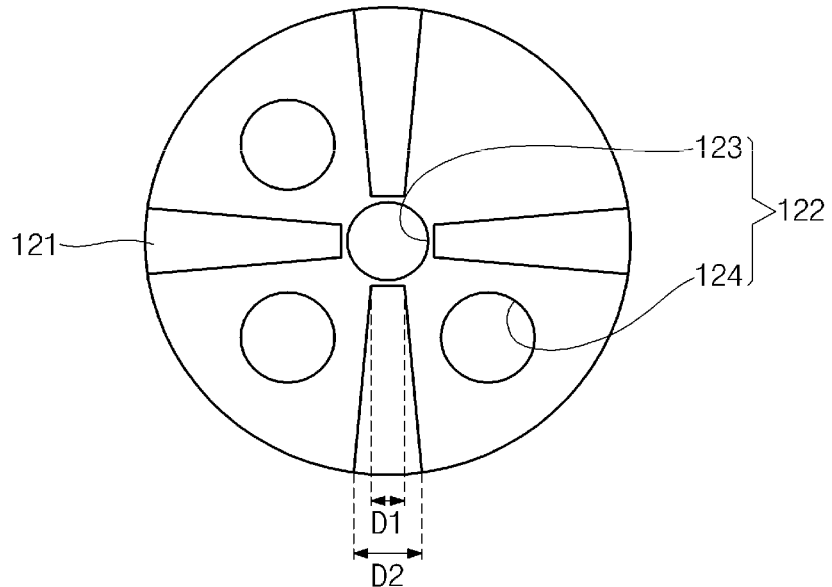
FIG. 3 is a plan view showing a first current collection plate shown in FIG. 2.

FIG. 1 is a cross-sectional view illustrating a secondary battery according to an embodiment of the present invention. FIG. 2 is an exploded perspective view illustrating a part of a secondary battery according to an embodiment of the present invention. FIG. 3 is a plan view showing a first current collection plate shown in FIG. 2.

Referring to FIGS. 1 and 2, a secondary battery according to an embodiment of the present invention includes an electrode assembly 110, a first current collection plate 120, a second current collection plate 130, a case 140, and a cap assembly 150.

The electrode assembly 110 includes a first electrode plate 111, a second electrode plate 112, and a separator 113 interposed between the first electrode plate 111 and the second electrode plate 112. The electrode assembly 110 may be formed by winding a stack of the first electrode plate 111, the separator 113, and the second electrode plate 112 in a jelly-roll form. Here, the first electrode plate 111 may function as a positive electrode, and the second electrode plate 112 may function as a negative electrode.

The first electrode plate 111 is formed by coating a first electrode active material such as a transition metal oxide on a first electrode current collector formed of a metal foil such as aluminum. A first electrode uncoated part 111a which is not coated with a first electrode active material is formed on the first electrode plate 111, and a first current collection plate 120 is electrically connected to the first electrode uncoated part 111a.

The second electrode plate 112 is formed by coating a second electrode active material such as graphite or carbon on a second electrode current collector formed of a metal foil such as copper or nickel. A second electrode uncoated part 112a to which a second electrode active material is not applied is formed on the second electrode plate 112, and a second current collection plate 130 is electrically connected to the second electrode uncoated part 112a.

The first current collection plate 120 is coupled to an upper portion of the electrode assembly 110 and is electrically connected to the first electrode uncoated part 111a. The first current collection plate 120 is formed of a circular plate so as to correspond to the transverse cross-section of the electrode assembly 110. The first current collection plate 120 includes a concave-convex part 121 and a through-hole 122.

The concave-convex part 121 is formed in the form of a groove protruding downward from the first current collection plate 120, and a plurality of concave-convex parts 121 may be formed. For example, as shown in FIG. 2, the concave-convex part 121 consists of four grooves and may be arranged in a "+" shape. That is, each concave-convex part 121 may be arranged to be spaced apart at intervals of 90 degrees with respect to the center of the first current collection plate 120. Meanwhile, in the present invention, the number of concave-convex parts 121 is not limited, and four or more concave-convex parts 121 or fewer than four concave-convex parts 121 may be formed. The concave-convex part 121 may be welded to the first electrode uncoated part 111a of the electrode assembly 110. Here, the concave-convex part 121 may be connected to the first electrode uncoated part 111a by laser welding, ultrasonic welding, resistance welding, or the like. Additionally, before connecting the concave-convex part 121 to the first electrode uncoated part 111a, by performing a compaction process of flattening the first electrode uncoated part 111a by pressing a portion of the first electrode uncoated part 111a can be easily welded to the concave-convex part 121. Here, a region that is flatly formed by pressing the first electrode uncoated part 111a is defined as a pressurized region 111b.

In addition, referring to FIG. 3, the concave-convex part 121 is formed in a trapezoidal shape in which the width thereof becomes wider from the center of the first current collection plate 120 toward the outer periphery thereof. That is, the concave-convex part 121 is formed such that the width D1 at the center of the first current collection plate 120 is narrower than the width D2 at the outermost side (D1<D2). This is for the purpose of equally pressing the pressurized region 111b to a predetermined depth in the compaction process of pre-pressing the first electrode uncoated part 111a to make same flat. In general, since the electrode assembly 110 wound in the jelly-roll form has a greater curvature at the center of winding than at the end of winding, if the electrode assembly 110 is pressed with the same area and the same force from the center of winding to the end of winding, the electrode assembly 110 is more pressed at the end of winding. Therefore, in the present invention, the width of the concave-convex part 121 is formed such that the width becomes gradually wider (increases) from the center to the outermost part, and the pressurized region 111b of the first electrode uncoated part 111a to which the concave-convex part 121 is welded is also formed to become wider (to increase) in width from the center of the electrode assembly 110 to the outermost part, thereby making the compaction level of the pressurized region 111b constant. That is, even when the first electrode uncoated part 111a is pressed with the same force during the compaction process, the pressurized region 111b has a shape in which the area of the pressurized region 111b becomes wider (increased) toward the outer periphery of the electrode assembly 110, and thus the depth of the pressurized region 111b in the first electrode uncoated part 111a may be the same. Accordingly, according to the present invention, weldability between the first current collection plate 120 and the electrode assembly 110 can be improved, and a short circuit of the electrode assembly 110 can be prevented.

The through-hole 122 is a hole into which the electrolyte is injected, and a plurality of through-holes may be formed in the first current collection plate 120. Specifically, the through-hole 122 may include a first through-hole 123 formed in the center of the first current collection plate 122 and a second through-hole 124 formed between the concave-convex parts 121. In addition, the number of the second through-holes 124 may be smaller than the number of the concave-convex parts 121. Accordingly, there is a region in which the second through-hole 124 is not formed in at least a region between the concave-convex parts 121. A lead tab 125 may be coupled to a region where the second through-hole 124 is not formed. The lead tab 125 may be connected to the cap assembly 150 to electrically connect the first current collection plate 120 to the cap assembly 150. That is, one end of the lead tab 125 is electrically connected to the first current collection plate 120, and the other end thereof is electrically connected to the cap assembly 150. Of course, the lead tab 125 may be integrally formed with the first current collection plate 120. For example, a portion of the first current collection plate 120 may be formed to extend to constitute the lead tab 125, and the lead tab 125 may be bent to be electrically connected to the cap assembly 150.

The second current collection plate 130 is coupled to a lower portion of the electrode assembly 110 and is electrically connected to the second electrode uncoated part 112a. The second current collection plate 130 is formed of a circular plate to correspond to the transverse cross-section of the electrode assembly 110. The first current collection plate 130 includes a concave-convex part 131, a through-hole 132 and a connection part 135.

The concave-convex part 131 is formed in the form of a groove protruding upward from the second current collection plate 130, and a plurality of concave-convex parts 131 may be formed. For example, as shown in FIG. 2, the concave-convex part 131 may have four grooves and may be arranged in a "+" shape. That is, the concave-convex part 131 of the second current collection plate 130 and the concave-convex part 121 of the first current collection plate 120 are formed in the same manner, but differ from each other only in that the protruding directions thereof are opposite to each other. Therefore, the following description will focus on the differences therebetween.

The concave-convex part 131 may be welded to the second electrode uncoated part 112a of the electrode assembly 110. In addition, a compaction process for flattening the second electrode uncoated part 112a may be performed by pressing a portion of the second electrode uncoated part 112a, like the first electrode uncoated part 111a, the concave-convex part 131 may be easily welded to the second electrode uncoated part 112a. In addition, the concave-convex part 131 is formed in a trapezoidal shape in which the width of the concave-convex part 131 becomes wider from the center of the second current collection plate 130 to the outer periphery thereof. The concave-convex part 131 may be welded to the second electrode uncoated part 112a of the electrode assembly 110.

The through-hole 132 is a hole through which the electrolyte moves, and a plurality of through-holes may be formed in the second current collection plate 130. The through-hole 132 may be formed between the concave-convex parts 131. In addition, a connection part 135 is formed in the center of the second current collection plate 130. That is, the connection part 135 is formed in a portion corresponding to the position where the first through-hole 123 is formed in the first current collection plate 120. The connection part 135 is formed to protrude downward from the second current collection plate 130. The connection part 135 is electrically connected to a lower surface plate 142 of the case 140 to be described later. For example, the connection part 135 may be electrically connected to the case 140 by laser welding, ultrasonic welding, resistance welding, or the like.

The case 140 includes a side plate 141 that is a cylindrical body having a predetermined diameter to form a space in which the electrode assembly 110 is accommodated, and a lower plate 122 that seals a lower portion of the side plate 141. An upper opening of the case 140 is opened to seal after the electrode assembly 110 is inserted. In addition, a beading part 143 for preventing the electrode assembly 110 from moving is formed on an upper portion of the case 140. A crimping part 144 for fixing the cap assembly 150 is formed at the uppermost end of the case 140.

The cap assembly 150 includes a cap up 151, a safety vent 152 coupled to a lower portion of the cap up 151, a cap down 153 coupled to a lower portion of the safety vent 152, and an insulator 154 positioned between the safety vent 152 and the cap down 153, a sub plate 155 coupled to a lower portion of the cap down 133 and electrically connected to the safety vent 152, and a gasket 156 interposed therebetween the outer periphery of the safety vent 152 and the case 140. The sub-plate 155 is electrically connected to the lead tab 125 of the first current collection plate 120.

A method for manufacturing a secondary battery having the above configuration will now be briefly described.

First, the electrode assembly 110 is formed by winding a stack of the first electrode plate 111, the second electrode plate 112 and the separator 113 interposed between the first electrode plate 111 and the second electrode plate 112. In addition, the pressurized region 111b is formed in the first electrode uncoated part 111a protruding upward of the electrode assembly 110. Here, the pressurized region 111b has a "+" shape so as to correspond to the concave-convex part 121 of the first current collection plate 120, and is formed such that the width thereof becomes wider from the center region toward the outermost part. Likewise, a pressurized region is also formed in the second electrode uncoated part 112a protruding downward from the electrode assembly 110.

Next, the first current collection plate 120 is coupled to the upper portion of the electrode assembly 110, and the second current collection plate 130 is coupled to the lower portion of the electrode assembly 110. Specifically, the pressurized region 111b formed on the first electrode uncoated part 111a of the electrode assembly 110 and the concave-convex part 121 of the first current collection plate 120 are welded to each other, and the concave-convex part 131 of the second current collection plate 130 is welded to the pressurized region formed in the second electrode uncoated part 112a.

Then, the electrode assembly 110 to which the first and second current collection plates 120 and 130 are coupled is inserted into the case 140, the connection part 135 of the second current collection plate 130 and the lower plate 142 of the case 140 electrically connected to each other by welding, and the lead tab 125 of the first current collection plate 120 is electrically connected to the sub-plate 155 of the cap assembly 150 by welding. Next, an electrolyte solution is injected into the case 140, and the cap assembly 150 is coupled to the upper end of the case 140, thereby completing the secondary battery 100 according to the present invention.

Figure 4:
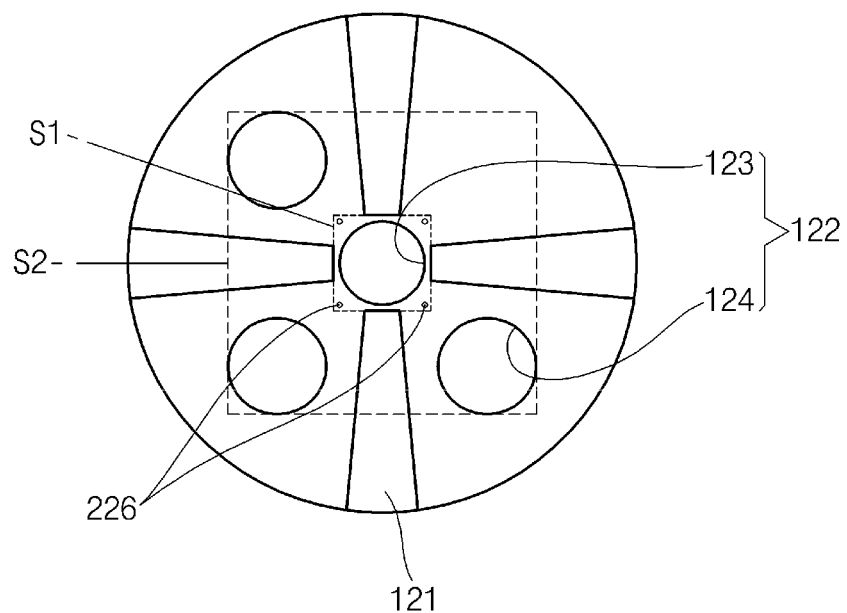
FIG. 4 is a plan view showing a first current collection plate according to another embodiment of the present invention.

FIG. 4 is a plan view showing a first current collection plate according to another embodiment of the present invention.

Referring to FIG. 4, the first current collection plate 220 according to another embodiment of the present invention includes a concave-convex part 121, a through-hole 122 and a position identification part 226.

The position identification part 226 is an engraving for identifying a position to be welded when a welding device (not shown) welds the first current collection plate 220 to the electrode assembly 110 by using Auto Position Align (APA)

technology. The position identification part 226 is formed around the first through hole 123 and is formed inside the second through hole 124. In addition, the position identification part 226 consists of four holes, which may be arranged to be spaced apart at intervals of 90 degrees. Also, the diameter of the hole 226 is smaller than that of the second through hole 124. In addition, although illustrated as having a circular shape in the drawings, the hole 226 may be formed in various shapes such as a square shape, a pentagonal shape, and the like.

For example, if the position identification part 226 is not formed on the first current collection plate 220, the welding device should scan an area S2 including the second through hole 124 in order to identify a welding position. However, as in the present invention, when the position identification part 226 is formed on the first current collection plate 220, the area S2 including the second through hole 124 has only to scan, and thus fast and accurate welding is enabled. In addition, the position identification part 226 may be formed not only on the first current collection plate 220, but also on the second current collection plate 130. In this case, the position identification part 226 formed on the second current collection plate 130 may be arranged around the connection part 135.

As described above, according to the present invention, provided is the first current collection plate 220 which is formed inside the second through-hole 124 and has a position identification part 226 formed with a plurality of holes having a smaller diameter than the second through-hole 124, thereby shortening the scanning time for identifying the welding position and improving the welding position accuracy.

Figure 5:
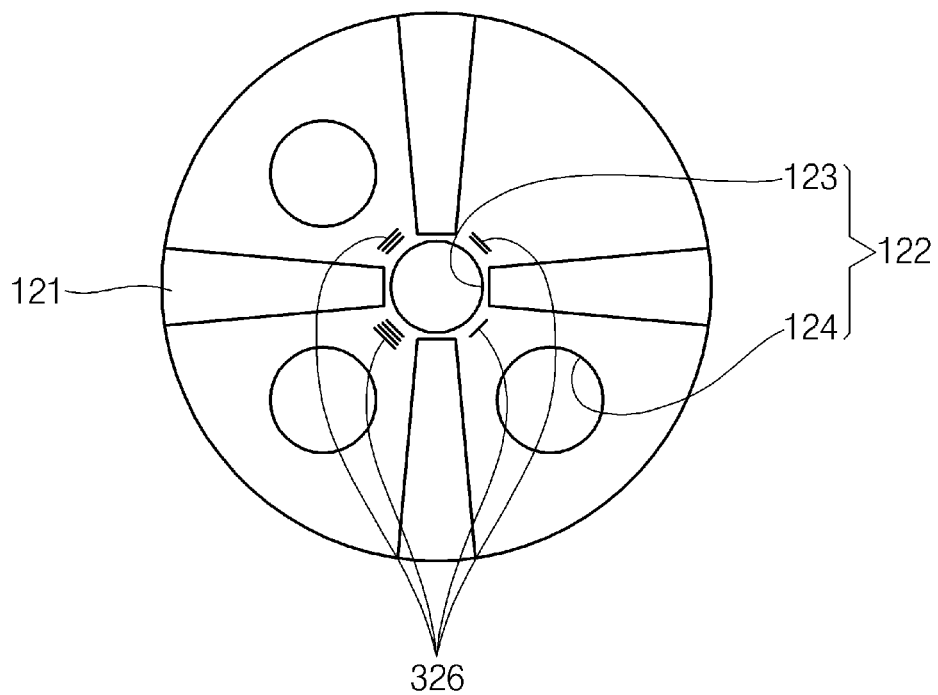
FIG. 5 is a plan view showing a first current collection plate according to another embodiment of the present invention.

FIG. 5 is a plan view showing a first current collection plate according to another embodiment of the present invention.

Referring to FIG. 5, the first current collection plate 320 according to another embodiment of the present invention includes a concave-convex part 121, a through-hole 122 and a position identification part 326. The position identification part 326 may be formed of engravings having different shapes. For example, the position identification part 326 may be arranged outside the first through hole 123 with a different number of holes or grooves having a substantially rectangular shape. Specifically, as shown in FIG. 5, the position identification part 326 may be arranged outside the first through hole 123 in a such a manner that the number of rectangular holes or grooves gradually increases. In addition, the position identification part 326 may be formed in an embossed shape to protrude from the first current collection plate 320.

While the foregoing embodiment has been described to practice the secondary battery of the present invention, it will be understood by those of ordinary skill in the art that various changes in form and details may be made therein without departing from the spirit and scope of the present invention as defined by the following claims.

The invention claimed is:

1. A secondary battery comprising:
    an electrode assembly which is formed by winding a first electrode plate having a first electrode uncoated part, a separator, and a second electrode plate having a second electrode uncoated part, the first electrode uncoated part protruding upwards, and the second electrode uncoated part protruding downwards; and
    a first current collection plate which is electrically connected to the first electrode uncoated part, the first current collection plate having a plurality of planar portions and a plurality of concave-convex parts protruding downwards between adjacent ones of the plurality of planar portions, the plurality of concave-convex parts being continuously connected to the plurality of planar portions along a direction away from a center of the first current collection plate,
    wherein a width of each of the plurality of concave-convex parts becomes wider from the center of the first current collection plate toward the outer periphery of the first current collection plate, and
    wherein the width of each of the plurality of concave-convex parts is greatest nearest the outer periphery of the first current collection plate.

2. The secondary battery of claim 1, wherein the first current collection plate comprises a first through-hole formed in the center and a plurality of second through-holes formed outside the first through-hole.

3. The secondary battery of claim 2, wherein the plurality of concave-convex parts are spaced apart from each other outside the first through-hole.

4. The secondary battery of claim 1, wherein the first electrode uncoated part includes a pressurized region that is partially pressurized to be flatly formed, and the plurality of concave-convex parts are welded to the pressurized region.

5. The secondary battery of claim 4, wherein the pressurized region is formed to increase in width from the center of the electrode assembly toward the outer periphery thereof so as to correspond to the plurality of concave-convex parts.

6. The secondary battery of claim 2, wherein the first current collection plate further comprises a position identification part formed outside the first through-hole.

7. The secondary battery of claim 6, wherein the first current collection plate comprises a second through-hole, and
    wherein the position identification part is formed with a plurality of grooves or holes, and is located nearer to the center of the first current collection plate than the second through-hole is.

8. The secondary battery of claim 6, wherein the position identification part is formed in an embossed shape.

9. The secondary battery of claim 6, wherein the position identification part is formed of engravings having different shapes to be spaced apart from each other.

10. The secondary battery of claim 1, further comprising a circular second current collection plate electrically connected to the second electrode uncoated part and having a concave-convex part protruding upward,
    wherein the width of the concave-convex part in the second current collection plate becomes wider from the center of the second current collection plate toward the outer periphery thereof.

* * * * *